(12) United States Patent
Xia

(10) Patent No.: US 8,069,224 B2
(45) Date of Patent: Nov. 29, 2011

(54) METHOD, EQUIPMENT AND SYSTEM FOR RESOURCE ACQUISITION

(75) Inventor: Tian Xia, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 12/094,954

(22) PCT Filed: May 22, 2008

(86) PCT No.: PCT/US2008/064536
§ 371 (c)(1),
(2), (4) Date: May 6, 2010

(87) PCT Pub. No.: WO2008/150725
PCT Pub. Date: Dec. 11, 2008

(65) Prior Publication Data
US 2010/0235509 A1 Sep. 16, 2010

(30) Foreign Application Priority Data
Jun. 1, 2007 (CN) .......................... 2007 1 0105896

(51) Int. Cl.
*G06F 15/16* (2006.01)
(52) U.S. Cl. .......................... 709/218; 709/217; 709/219
(58) Field of Classification Search .................... 709/218
See application file for complete search history.

(56) References Cited

U.S. PATENT DOCUMENTS

| | | | |
|---|---|---|---|
| 6,078,929 A | 6/2000 | Rao | |
| 6,249,794 B1 * | 6/2001 | Raman | 715/210 |
| 6,374,248 B1 | 4/2002 | Nazari | |
| 6,438,539 B1 | 8/2002 | Korolev et al. | |
| 6,453,350 B1 | 9/2002 | Factor | |
| 6,742,035 B1 | 5/2004 | Zayas et al. | |
| 7,051,095 B1 | 5/2006 | Cantwell | |
| 7,305,375 B2 | 12/2007 | Cioccarelli | |
| 7,562,149 B2 | 7/2009 | Teodosiu et al. | |
| 7,624,179 B2 | 11/2009 | Teodosiu et al. | |
| 2002/0040366 A1 | 4/2002 | Lahr | |
| 2002/0129164 A1 * | 9/2002 | Van Der Meulen et al. | 709/239 |
| 2003/0018621 A1 | 1/2003 | Steiner et al. | |
| 2003/0182280 A1 * | 9/2003 | Cormack et al. | 707/5 |
| 2006/0212533 A1 | 9/2006 | Vedula | |

FOREIGN PATENT DOCUMENTS

| | | |
|---|---|---|
| CN | 1506860 A | 6/2004 |
| CN | 1675621 A | 9/2005 |
| CN | 1773458 A | 5/2006 |
| CN | 1820268 A | 8/2006 |
| CN | 1916847 A | 2/2007 |
| GB | 2390448 A | 1/2004 |

* cited by examiner

*Primary Examiner* — John Follansbee
*Assistant Examiner* — Maceeh Anwari
(74) *Attorney, Agent, or Firm* — Lee & Hayes, PLLC

(57) ABSTRACT

A resource acquisition method uses a customer terminal to load a resource list defined in a uniform resource description file, where the resource list contains resource identifications and corresponding path information of the resources required by the customer terminal. The customer terminal obtains the path information of the required resource from the resource list according to the resource identification of the resource, and sends a request message to acquire the resource according to the path information. The customer terminal is thus able to accurately and rapidly obtain the required resources over a network, greatly improving the success rate and work efficiency of resource acquisition. This disclosure also discloses a network system for data communication and communication equipment that utilize the resource acquisition method.

17 Claims, 4 Drawing Sheets

```
<resources name="myresource" version="1.0">
    <resource id="myresource/tools">
        <svn url="http://www.mydomain.com:83/svn/branches/20070119/hangzhou/tools/"
            dir="E:/mydirectory/tools"/>
    </resource>
    <resource id="myresource/apple">
        <svn url="http://www.mydomain.com:83/svn/branches/20070119/hangzhou/apple/"
            dir="E:/mydirectory/apple"/>
    </resource>
</resources>
```

Fig. 5

METHOD, EQUIPMENT AND SYSTEM FOR RESOURCE ACQUISITION

RELATED APPLICATIONS

This application is a national stage application of international patent application PCT/US08/64536, filed May 22, 2008, claiming priority from Chinese patent application, Application No. 200710105896.X, filed Jun. 1, 2007, entitled "METHOD, EQUIPMENT AND SYSTEM FOR RESOURCE ACQUISITION".

BACKGROUND

This disclosure relates to the field of computer technologies, and particularly to method, system and equipment of acquiring computation resources.

Within a computer network system there are abundant resources. Customer terminals can acquire proper resources from different resource providers such as resource storages according to their own needs. However, in existing technologies, the resources in the network system are normally stored in many different memory devices, and these memory devices in turn may employ many different resource protocols. This easily results in confusion in resource protocols used in the network system and hence leads to situations in which customer terminals may not be able to acquire the required resources or in which the efficiency of resource acquisition is reduced. Moreover, existing network systems often lack a centralized management of version information of different resources.

To solve these problems, there have been suggestions in existing technologies that the resources required by customer terminals be stored in their respective customer terminals, such that the customer terminals may access the required resources at any time. However, there are limitations in this approach. For example, if many customer terminals in the network system require the same resources, each of these customer terminals needs to store the resources locally, thus creating a waste of memory space.

SUMMARY

This disclosure describes a method, a system and equipment of resource acquisition. The disclosed techniques aim to resolve the confusion in resource management in a network system. This confusion in resource management has caused failure of resource acquisition by customer terminals or reduction of efficiency of resource acquisition.

The disclosed resource acquisition method uses a customer terminal to load a resource list defined in a uniform resource description file, where the resource list contains resource identifications and corresponding path information of the resources required by the customer terminal. The customer terminal obtains the path information of the required resource from the resource list according to the resource identification of the resource, and sends a request message to acquire the resource according to the path information. The customer terminal subsequently receives from the resource storage the resource requested.

In one embodiment, the path information of the resource contains address information of the resource storage which stores the resource. In another embodiment, the path information of the resource contains specific uniform resource location of the resource. Alternatively, the path information contains address information of the resource storage in which another uniform resource description file is stored. The customer terminal may then obtain the other uniform resource description file according to the address information, and load its defined resource list. The customer terminal can subsequently obtain the path information of the resource from the resource list according to the resource identification.

The uniform resource description file may be either locally stored at the customer terminal, or stored on a network storage. The uniform resource description file may be either generated locally is received from a resource storage.

The resource storage may contain a second uniform resource description file, to be used when, for example, the required resource isn't available at the resource storage. In this situation, the method further obtains the second uniform resource description file from the resource storage according, loads a second resource list defined in the second uniform resource description file, obtains by the customer terminal a second path information of the resource from the second resource list according to the identification of the resource, and sends a second request message to a second resource storage according to the second path information to acquire the resource. Alternatively, the path information of the resource may contain address information of a second uniform resource description file, and the request message sent to the resource storage requests for the second uniform resource description file. In this configuration, the method obtains the second uniform resource description file from the resource storage according to the respective address information, loads a second resource list defined in the second uniform resource description file, obtains by the customer terminal a second path information of the resource from the second resource list according to the identification of the resource, and sends a second request message to a second resource storage according to the second path information to acquire the resource.

The customer terminal also obtains from the resource list protocol information for acquiring the resource, and generates the request message according to the protocol information. The protocol information obtained by the customer terminal may define a type of protocol used by the resource storage storing the resource. Alternatively, the protocol information defines a type of protocol used by the resource storage storing a second uniform resource description file.

In one embodiment, the request message sent from the customer terminal contains the resource identification of the resource required by the customer terminal. The customer terminal may receive from the resource storage one or more versions of the resource according to the resource identification. The request message sent from the customer terminal may contain the resource identification and version information of the resource required by the customer terminal. The customer terminal receives from the resource storage a version of the resource according to the resource identification and the version information contained in the request message.

After receiving the required resource at the customer terminal from the resource storage, the customer terminal may modify (update) the path information of the resource in the resource list according to the current storage location of the resource on the resource storage.

Another aspect of this disclosure is a data communication equipment including a storage unit, a processing unit and a communication unit. The storage unit is used to store a uniform resource description file, which defines a resource list containing resource identification and corresponding path information of a resource required by customer terminal. The processing unit is used to obtain path information of the resource from the resource list according to the resource identification of the resource, and to generate a request message for acquiring the resource. The communication unit is used to send out the request message according to the path information, and to receive the acquired resource. The processing unit may further obtain protocol information of the resource from the resource list according to the resource identification of the resource, and generate the request message according to the protocol information.

Another aspect of this disclosure is a network system for data communication including a resource storage used to store resources and a customer terminal used to load a resource list defined in a local uniform resource description file. The resource list contains resource identification and corresponding path information of a resource required by the customer terminal. The customer terminal obtains from the resource list the path information of the resource required by the customer terminal according to the resource identification of the required resource, and sends out a request message for acquiring the required resource according to the path information. The resource storage provides the required resource to the customer terminal upon receiving the request message. The customer terminal may obtain protocol information of the required resource from the resource list according to the resource identification, and generate the request message according to the protocol information. The resource storage may further store a uniform resource description file, and send the uniform resource description file to the customer terminal if the required resource is not available in the resource storage.

In one embodiment, the resource storage sends either multiple versions or the latest version of the required resource to the customer terminal. If the version is specified by the customer terminal, the resource storage sends to the customer terminal the version of the required resource specified in the request message.

Through the resource list defined in the local uniform resource description file, the customer terminal obtains resource identifications and corresponding path information of the resources to be used. The customer terminal may thus be able to accurately and rapidly obtain the required resources. This may greatly improve the success rate and work efficiency of resource acquisition by the customer terminal. The resource list further contains records of the required protocol information and version information for each resource. Therefore, even though many resource protocols and many versions of the resource may exist within the network system, the customer terminal can still generate request message with the right resource protocol according to the resource list and acquire the resource. The customer terminal can also specify a particular version of the resource in the request message based on the configuration, further increasing the success rate and accuracy of resource acquisition by the customer terminal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 5 shows an exemplary uniform resource description file in the form of an XML configuration file.

DETAILED DESCRIPTION

In this description, a resource may be any computation resource, such as a network resource, a Web resource, or system resource. A resource is any physical or virtual component available within a computer system. Virtual system resources include files, programs, network connections and memory areas.

In the exemplary embodiments of this disclosure, the customer terminal has a uniform resource description file which defines a detailed list of all resources required by the customer terminal. This detailed list is referred to as resource list. The uniform resource description file is locally available at the customer terminal. For example, the uniform resource description file may be locally stored at the customer terminal, or stored in a network storage readily accessible by the customer terminal. The uniform resource description file may be either generated locally or received from a resource storage.

Referring to TABLE 1, a resource list contains resource identifications (resource IDs) of all resources required by the customer terminal.

TABLE 1

| Resource ID | Local Version Information | Local Path Information | Remote Version Information | Remote Path Information | Protocol information | Interface Type Information | ... |
|---|---|---|---|---|---|---|---|
| A | 1.0 | address 1 | 2.3 | address 1' | http | port 1 | ... |
|   |     |           | 3.4 | address 1" | https | port 2 | ... |
| B |     |           | 5.0 | address 2' | socket | port 3 | ... |
| ... | ... | ... | ... | ... | ... | ... | ... |

The resource list also contains resource version information (which includes local version information and remote version information), path information (which is used for locating resources), protocol information, interface type information and resource version information. Users may increase or decrease table entries in the resource list according to their application environment. Such exemplary variations will not be described further here.

When a customer terminal wants to obtain a resource from the network system, the customer terminal loads the resource list defined in the uniform resource description file, and obtains the path information of the required resource from the resource list according to the resource ID of the required resource. The customer terminal then sends out request message for obtaining the resource according to the path information.

Figure 1:
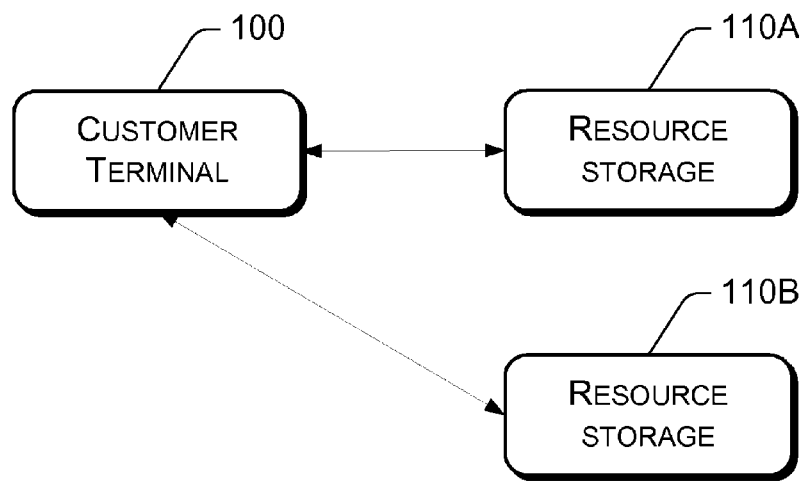
FIG. 1 is a schematic diagram of an exemplary network system for data communication in accordance with the present disclosure.

FIG. 1 is a schematic diagram of an exemplary network system for data communication in accordance with the present disclosure. As shown in FIG. 1, the network system in this exemplary embodiment has a customer terminal 100 and resource storages 110A and 110B. The system may include any number of resource storages like 110A and 110B. The customer terminal 100 is used to load resource list defined in local uniform resource description file. The customer terminal 100 then obtains the path information of the required resource from the resource list based on the resource ID of that resource, and sends out a request message for obtaining the resource according to the path information.

The resource list also contains protocol information to specify the protocol type required or preferred for each resource. Such information may be applicable in situations where different protocols are used in the resource storages 110A and 110B in the system. For example, customer terminal 100 can generate a request message with a suitable resource protocol according to the protocol information corresponding to the required resource. The resource storages (110A, 110B) are used to store different resources in the network system and return corresponding resources upon receiving a request message from customer terminal 100.

In this exemplary embodiment, a resource storage (110A, 110B) may add same time be customer terminal similar to customer terminal 100, and vice versa. A resource storage (110A, 110B) may be a server in the network, or any system, subsystem or component with storage capability.

Each resource storage (110A, 110B) may also have its own uniform resource description file. If the requested resource storage (110A, 110B) does not have the resource required by the customer terminal 100, the resource storage (110A, 110B) may send its uniform resource description file to the customer terminal 100 for further actions.

Figure 2:
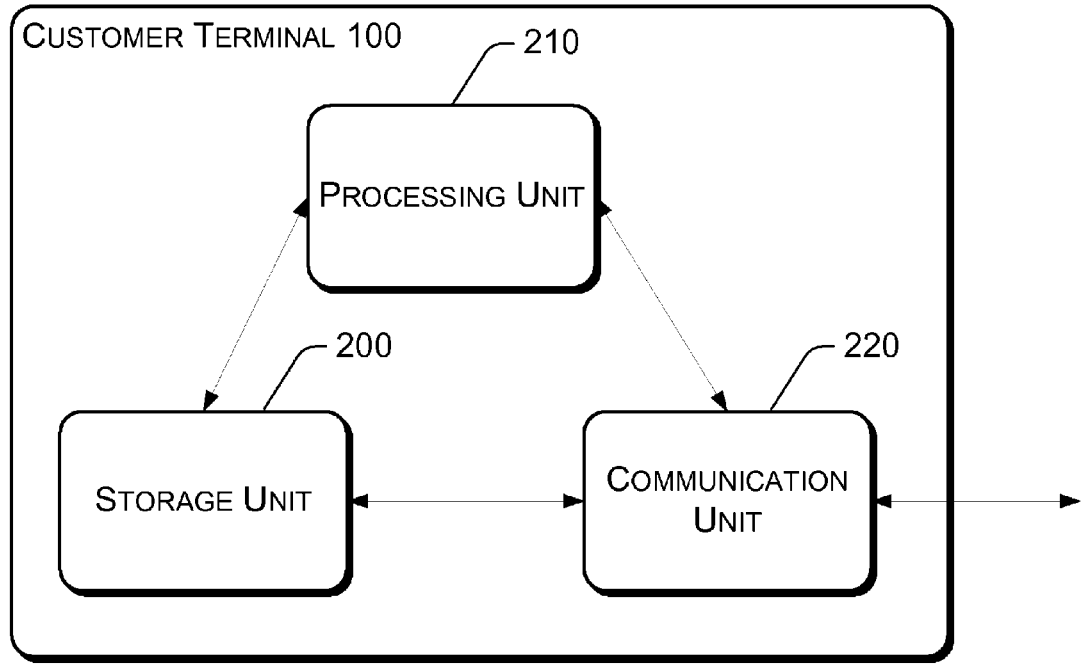
FIG. 2 shows an exemplary configuration of the customer terminal of FIG. 1.

FIG. 2 shows an exemplary configuration of the customer terminal 100 of FIG. 1. Customer terminal 100 has a storage unit 200, a processing unit 210 and a communication unit 220. The storage unit 200 is used to store the uniform resource description file. The processing unit 210 is used to load the uniform resource description file and obtain the path information of the required resource from the resource list defined in the uniform resource description file. This is done according to the resource ID of the resource. Specifically, for a resource of a given resource ID, the path information of the resource is identified and obtained from the resource list defined in the uniform resource description file. The processing unit 210 generates a request message with a proper resource protocol according to the protocol information of the resource recorded in the resource list. The communication unit 220 is used to send out the request message according to the path information and subsequently receive the resource.

The path information of the resource may be either direct or indirect, and be specific at various levels. For example, the path information may contain address information of the resource storage which stores the resource. The path information of the resource may contain specific uniform resource location of the resource (such as a URL). The path information may be a link to another file or source that contains more specific path information of the required resource.

Figure 3:
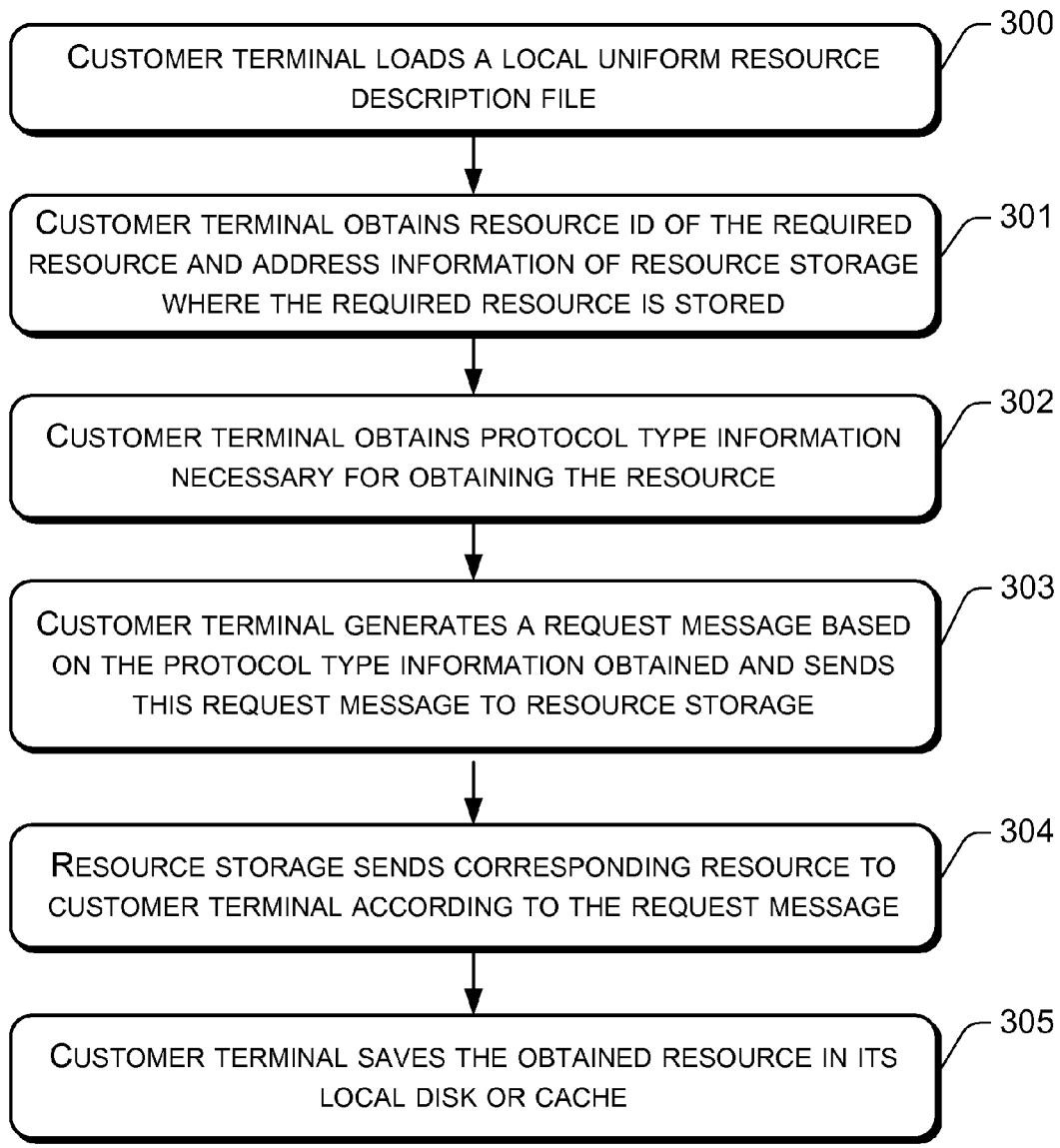
FIG. 3 is a flowchart of an exemplary process used by a customer terminal to acquire a required resource in a network system for data communication disclosed herein.

FIG. 3 is a flowchart of an exemplary process used by a customer terminal to acquire a required resource in a network system for data communication disclosed herein. In this description, the order in which a process is described is not intended to be construed as a limitation, and any number of the described process blocks may be combined in any order to implement the method, or an alternate method.

An exemplary process of how customer terminal 100 acquires a resource in the network system is described as follows.

Block 300: Customer terminal 100 loads a uniform resource description file, which can be a local uniform resource description file.

Block 301: According to the resource ID of the required resource, customer terminal 100 obtains path information of that resource from the resource list defined in the uniform resource description file. In one exemplary embodiment, the path information contains address information of resource storage 110A in which the resource required by the customer terminal 100 is stored.

Block 302: Customer terminal 100 obtains from the resource list protocol information which defines a suitable protocol type for acquiring the resource. For example, the protocol information may define the type of resource protocol used by the resource storage 110A, which may store the required resource and/or another uniform resource description file containing further information of the resources.

Block 303: Customer terminal 100 generates a request message with the proper resource protocol according to the protocol information obtained, and sends this request message to the resource storage 110A. The request message contains the resource ID of the required resource. Sometimes, the request message may also include the version information of the resource.

In a practical application, one could preset a uniform protocol type to be used by every resource storage (110A, 110B). In the situation, upon receiving the path information of the required resource, the customer terminal 100 can directly generate the request message corresponding to the preset type of protocol.

Block 304: Upon receiving the request message from the customer terminal 100, the resource storage 110A then sends the requested resource to customer terminal 100.

In this exemplary embodiment, depending on the configuration, the resource storage 110 may send the resource to the customer terminal 100 in a number of different ways. For example, if the resource storage 110A has the functionality of managing version information of the resources, the resource storage 110A can send a particular version of the resource (e.g., the latest version) to the customer terminal 100. Alternatively, the resource storage 110A can send a customer-specified version of the resource to the customer terminal 100 according to the resource ID and specific version information in the request message.

If the resource storage 110A does not have the functionality of managing version information of the resources, the resource storage 110A may send all available versions of the resource to the customer terminal 100, leaving it to the customer terminal 100 to determine which version of the resource to be installed based on the configuration of the customer terminal 100. The resource storage 100A may alternatively send any version (such as the latest version) to the customer terminal 100.

Block 305: Customer terminal 100 saves the acquired resource into a local disk or cache. Customer terminal 100 may at this point modify (update) the path information of this resource in the resource list according to the storage location of the resource. For example, if the storage location of the resource at resource storage 110A is different from the current path information of the resource indicated in the resource list, the path information may be updated to reflect the new storage location of the resource at resource storage 110A. In addition, because customer terminal 100 may itself be a resource storage (similar to resource storages 100A and 100B) providing resources to other customer terminals in the data convocation system, the path information in the resource list may also be updated to indicate that there is a copy of the resource available at customer terminal 100.

Figure 4:
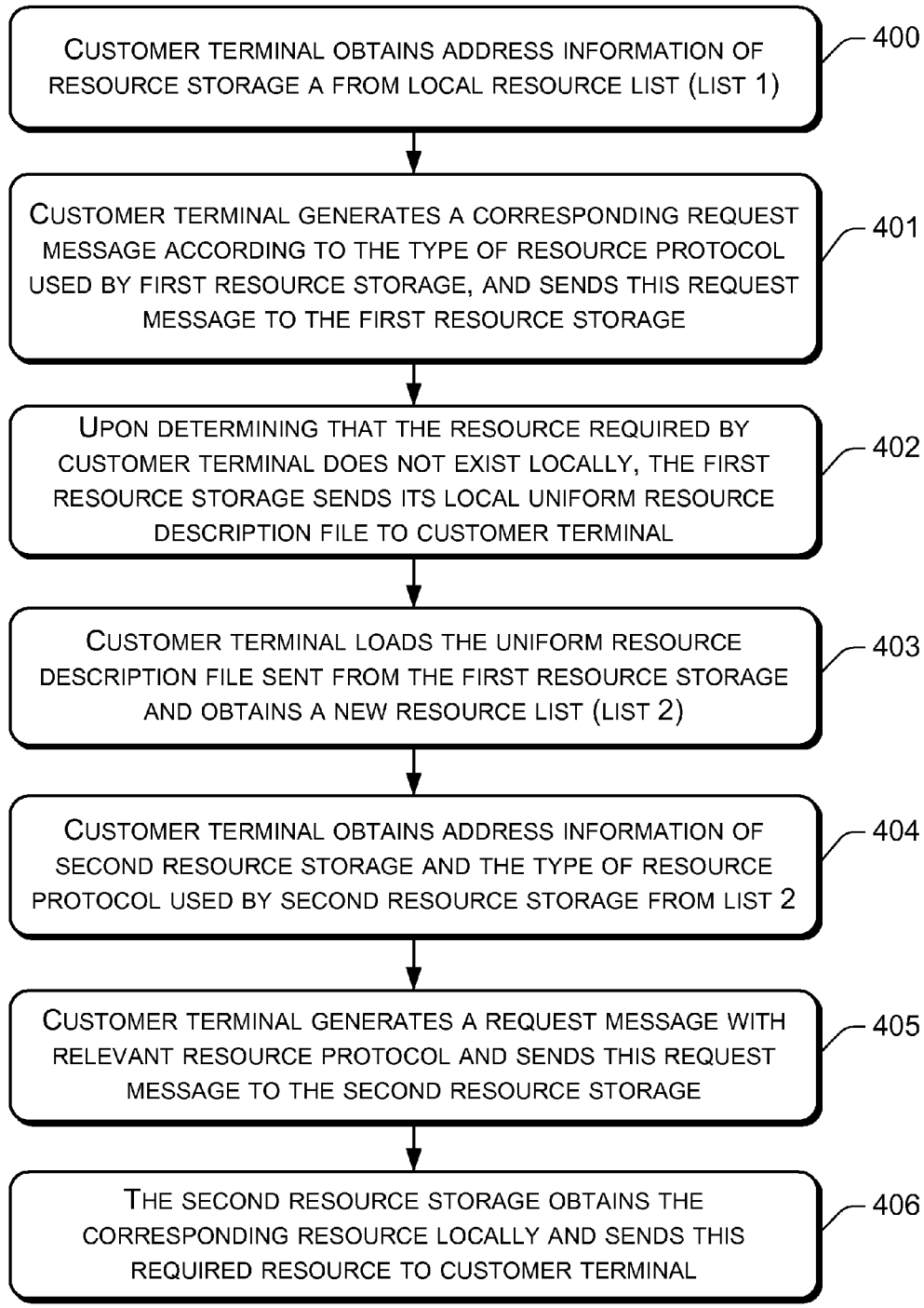
FIG. 4 is a flowchart of another exemplary process used by a customer terminal to acquire a required resource in a network system for data communication disclosed herein.

FIG. 4 is a flowchart of another exemplary process used by a customer terminal to acquire a required resource in a network system for data communication disclosed herein. This embodiment is different from the exemplary embodiment illustrated above with reference to FIG. 3. In the exemplary embodiment of FIG. 4, the resource storage 110A has its own local uniform resource description file which may be sent to customer terminal 100 either upon request or when the resource required by customer terminal 100 is unavailable in resource storage 110A. In this embodiment, the resource storage 110A sends its local uniform resource description file to the customer terminal 100, which will then complete the remaining operation. The process in FIG. 4 is described in further details as follows:

Block 400: Customer terminal 100 obtains address information of resource storage 110A according to resource ID of the required resource from a resource list (called list 1 hereinafter) defined in a resource description file locally available at customer terminal 100.

Block 401: The customer terminal 100 obtains information of the resource protocol used by the resource storage 110A and generates a request message with a proper resource protocol. Thereupon the customer terminal 100 sends the request message to the resource storage 110A to request the required resource.

Block 402: Based on the resource ID in the request message received, the resource storage 110A determines that the corresponding resource is unavailable locally (at resource storage 100A). Resource storage 110A then sends its local uniform resource description file to customer terminal 100.

Block 403: Customer terminal 100 loads the uniform resource description file sent from resource storage 110A, and obtains a new resource list (referred to as list 2 hereinafter), which contains a new path information of the required resource indicating availability of the required resource at another resource storage 100B.

Block 404: Using the resource ID of the required resource, the customer terminal 100 obtains address information and resource protocol information of resource storage 110B from the list 2.

Block 405: The customer terminal 100 generates a new request message with proper resource protocol, and sends this request message to the resource storage 110B.

Block 406: According to the resource ID in the request message, resource storage 110B obtains corresponding resource and sends this resource to customer terminal 100.

If the resource storage 110B too does not have the resource required by the customer terminal 100 either, resource storage 110B may perform the same procedure above as that performed by resource storage 100A. Specifically, resource storage 100B sends its local uniform resource description file to the customer terminal 100 which will then complete the remaining operations. The process is similar to the above described process and is not repeated here.

The uniform resource description files used in the network system disclosed herein can adopt many different file formats such as configuration file in XML format.

FIG. 5 shows an exemplary uniform resource description file in the form of an XML configuration file, the content of which is given below:

```
<resources name="myresource" version="1.0">
    <resource id="myresource/tools">
        <svn url="http://www.mydomain.com:83/svn/branches/20070119/hangzhou/tools/"
            dir="E:/mydirectory/tools"/>
    </resource>
    <resource id="myresource/apple">
        <svn url="http://www.mydomain.com:83/svn/branches/20070119/hangzhou/apple/"
            dir="E:/mydirectory/apple"/>
    </resource>
</resources>
```

Depending on the running environment of the network system, configuration files of different formats may be used.

In summary, in the exemplary embodiments of this disclosure, a customer terminal (100) obtains from a resource list resource identifications and corresponding path information of the resources to be used. The resource list is defined in a uniform resource description file locally available at the customer terminal. This way, the customer terminal may acquire the required resource conveniently and quickly, thus increasing the success rate and work efficiency of the resource acquisition of the customer terminal, and also improving the usage experience of the user. The resource list may also record the required protocol information and version information for the resource. Accordingly, in case where multiple resource protocols and multiple versions of each resource are available in the network system, the customer terminal can still generate a request message with proper resource protocol according to the resource list to obtain the resource. The customer terminal can also specify a particular version of the resource in the request message according to its configuration. As a result, the method and system described herein further improves the success rate and accuracy of resource acquisition by a customer terminal.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A resource acquisition method, comprising:
loading to a customer terminal a first resource list defined in a first uniform resource description file, wherein:
the first resource list contains an identification of a resource, first path information of the resource required by the customer terminal and first resource protocol information associated with the resource, and the first uniform resource description file is at least one of generated locally at the customer terminal or received by the customer terminal from a resource storage;
obtaining at the customer terminal the first path information of the resource from the first resource list according to the identification of the resource;
generating a first request message according to the first protocol information associated with the resource contained in the first resource list;
sending the first request message to a first resource storage according to the first path information to acquire the resource;
determining whether the resource is available at the first resource storage;
in an event that the resource is available at the first resource storage, receiving from the first resource storage the resource requested; and
in an event that the resource is not available at the first resource storage;
obtaining a second resource description file from the first resource storage, loading to the customer terminal a second resource list, wherein the second resource list contains the identification of the resource, second path information of the resource required by the customer terminal and second resource protocol information associated with the resource,
obtaining by the customer terminal the second path information of the resource from the second resource list according to the identification of the resource,
generating a second request message according to the second resource protocol information associated with the resource contained in the second resource list, and sending the second request message to a second resource storage according to the second path information.

2. The resource acquisition method as recited in claim 1, wherein the first resource storage stores the resource.

3. The resource acquisition method as recited in claim 1, wherein the first and second path information of the resource contains address information of the resource storage which stores the resource.

4. The resource acquisition method as recited in claim 1, wherein the first and second path information of the resource contains specific uniform resource location of the resource.

5. The resource acquisition method as recited in claim 1, wherein the second uniform resource description file is, generated at the first resource storage.

6. The resource acquisition method as recited in claim 1, wherein the first path information of the resource contains address information of the second uniform resource description file, the request message sent to the first resource storage requests the second uniform resource description file, and the obtaining of the second resource description file comprises obtaining the second uniform resource description file based on the address information of the second uniform resource description file contained in the first path information of the resource.

7. The resource acquisition method as recited in claim 1, wherein the first protocol information obtained by the customer terminal defines a type of protocol used by the first resource storage storing the resource.

8. The resource acquisition method as recited in claim 1, wherein the first protocol information obtained by the customer terminal defines a type of protocol used by the first resource storage storing a second uniform resource description file.

9. The resource acquisition method as recited in claim 1, wherein the request message sent from the customer terminal contains the resource identification of the resource required by the customer terminal, the method further comprising:
receiving to the customer terminal from the first resource storage one or more versions of the resource according to the resource identification.

10. The resource acquisition method as recited in claim 1, wherein the request message sent from the customer terminal contains the resource identification and version information of the resource required by the customer terminal, the method further comprising:
receiving to the customer terminal from the first resource storage a version of the resource according to the resource identification and the version information contained in the request message.

11. The resource acquisition method as recited in claim 1, further comprising:
modifying the path information of the resource in the first resource list according to a current storage location of the resource.

12. A data communication equipment, comprising:
a storage unit configured to store a uniform resource description file, wherein the uniform resource description file defines a resource list containing an identification of a resource, protocol information associated with the resource and path information of the resource required by customer terminal, and the path information of the resource contains address information of another uniform resource description file containing the identification of the resource, second path information of the resource required by the customer terminal and second resource protocol information associated with the resource;
a processing unit configured to:
obtain the path information of the resource from the resource list according to the resource identification of the resource,
generate a request message for acquiring the resource according to the protocol information associated with the resource, and determine whether the resource is available; and
a communication unit configured to;
if the resource is available:
send out the request message according to the path information, and receive the acquired resource, if the resource is not available:
obtain the another uniform resource description file, and acquire the resource according to the second path information and the second resource protocol information associated with the resource.

13. The communication equipment as recited in claim 12, wherein the path information of the resource in the resource list is updated according to a current storage location of the resource.

14. A network system for data communication, comprising:
a resource storage configured to:
store resources in a network system, and provide resources upon receipt of request messages; and a customer terminal configured to:

load a resource list defined in a local uniform resource description file, wherein the resource list contains an identification of a resource required by the customer terminal, path information of the resource required by the customer terminal, and protocol information associated with the resource, obtain from the resource list the path information of the resource required by the customer terminal according to the resource identification of the required resource, generate a request message according to the protocol information associated with the resource, send out the request message to receive the required resource according to the path information, and update the path information of the resource in the resource list according to a current storage location of the resource.

15. The network system for data communication as recited in claim 14, wherein the resource storage further stores a uniform resource description file, and the resource storage is configured to send the uniform resource description file to the customer terminal if the required resource is not available in the resource storage.

16. The network system for data communication as recited in claim 14, wherein the resource storage is configured to send either multiple versions or a particular version of the required resource to the customer terminal based on whether the resource storage has a functionality of managing version information of the resource, wherein:

in an event that the resource storage has the functionality of managing version information of the resource, the resource storage is configured to send the particular version of the required resource to the customer terminal;

and in an event that the resource storage does not have the functionality of managing version information of the resource, the resource storage is configured to send multiple available versions of the required resource to the customer terminal.

17. The network system for data communication as recited in claim 14, wherein the resource storage is configured to send to the customer terminal a version of the required resource specified in the request message.

* * * * *